(No Model.)

A. W. BURROWS.
EAR MARK FOR ANIMALS.

No. 350,112.                     Patented Oct. 5, 1886.

WITNESSES:
Edward W. Schirach
Alexander R. Arbuckle

Asa W. Burrows.
INVENTOR

BY James F. Coyne
ATTORNEY

UNITED STATES PATENT OFFICE.

ASA W. BURROWS, OF CHICAGO, ILLINOIS.

EAR-MARK FOR ANIMALS.

SPECIFICATION forming part of Letters Patent No. 350,112, dated October 5, 1886.

Application filed February 16, 1885. Serial No. 156,079. (No model.)

*To all whom it may concern:*

Be it known that I, ASA W. BURROWS, a citizen of the United States, residing at Chicago, in the county of Cook and State of Illinois, have invented a new and useful Ear-Mark, of which the following is a specification.

Figure 1:
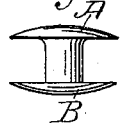
Figure 2:
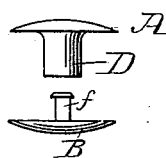
Figure 3:
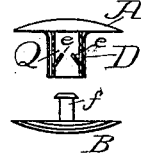
Figure 4:
Figure 5:
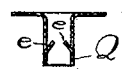
Figure 6:
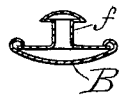
Figure 6:
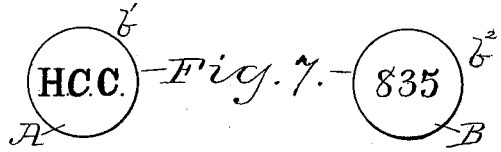

Figure 1 is a side elevation of my invention. Fig. 2 is a side view showing the parts separated. Fig. 3 is a view similar to Fig. 2, but showing the shank of the uppermost part in cross-section. Fig. 4 is a detail view. Fig. 5 is a transverse vertical section of the shank of the uppermost part. Fig. 6 is a side view showing the lower part in cross-section. Fig. 7 shows plan views of the parts of my invention.

My ear-mark is formed of two parts, each composed of several pieces. The undermost part (shown in Fig. 5) is formed by a circular face-plate, B, having its annular edges flanged upward and inward to secure the other piece—viz., a bolt or tenon, $f$. The circular plate formed at the base of bolt $f$ is then placed flat against the under side of the face-plate B, and the flanged edges of the face-plate are then bent inward, so as to lap over the edges of the circular base-plate of bolt $f$, to secure the same in position. The extremity of bolt $f$ is provided with a head which is of greater lateral dimensions than the body thereof.

The upper part of my invention (shown in Figs. 1, 2, and 3) consists of a circular plate, A, having its annular edges flanged downward and inward, a tubular shank, Q, and a cylindrical protector, D. The tubular shank Q has its edges contiguous to the under side of the plate A flanged outward, and the protector D has a similar basal flange. Protector D is preferably made of some innoxious material and is of such diameter that it can be placed over and surround shank Q, and its basal flange is placed flat against and over the flange of said shank. In this position the edges of the plate A lap over and confine the edges of said shank and protector and hold them in their relative positions. In the sides of shank Q, diametrically opposite each other, are made the longitudinal tongues $e\ e$, the roots of which are nearest the outer edges, and the free ends of which point toward the flanged end of said shank, as shown in Fig. 5.

The shank Q is placed concentric on plate A, as also is the bolt or tenon $f$ on plate B. Thus, when it is desired to mark an animal, one part is placed on one side of the ear and the other part on the other side, so that the shank Q and bolt $f$ are concentric to and face each other. They are then brought forcibly together, biting through the cartilage of the ear, bolt $f$ passing into shank Q, pressing the tongues $e\ e$ apart until the head of bolt $f$ has passed them, whereupon said tongues spring back to their normal positions, thus preventing the withdrawal of the bolt, and consequently the separation of the two parts.

In order to make my ear-mark innoxious, I can make those parts thereof exposed to the wound in the ear of zinc. I make the protector, which prevents any attempts to pick the two principal parts of my mark apart, of zinc; but the bolt $f$ and shank Q, I prefer to make of copper or brass. If this latter suggestion is followed, the moist contact between the zinc and copper or brass generates a slight electric current, which will have a healing effect on the wound. Gutta-percha or other harmless material may be substituted for the zinc, if desired.

In order to designate the record-number or name or initials of the owner on the face-plates A and B, as shown in Fig. 7 at $b'$ and $b^2$, the matter is sunk or embossed on the face-plates before they are put together.

When locked together in the ear, the parts of my invention cannot be separated but by lacerating the ear.

If desired, the protector D may be dispensed with, and just the tenon and shank be used. This would simplify the device, and it might by some persons be preferred.

What I claim is—

1. The combination, with the plate B and bolt or tenon $f$, having a head, of plate A, shank Q thereof, and tongues $e\ e$ within the same for locking said bolt to prevent its withdrawal.

2. The combination, with plate B, having bolt $f$ projecting therefrom, of plate A, having shank Q and protector D, as set forth.

ASA W. BURROWS.

Witnesses:
SIMEON J. MITCHELL,
C. B. HARTON.